United States Patent Office 3,253,664
Patented May 31, 1966

3,253,664
SEALING POROUS FORMATIONS
Charles A. Sauber and Francis J. Shell, Bartlesville, Okla., assignors to Phillips Petroleum Company, a corporation of Delaware
No Drawing. Filed Dec. 31, 1962, Ser. No. 248,224
6 Claims. (Cl. 175—72)

This invention relates to a method and a composition for sealing porous formations, particularly porous formations in the earth encountered in the drilling of a well.

In the drilling of a well with well drilling tools a drilling fluid is circulated into and out of the well bore as a necessary step in the operation. The drilling fluid serves to cool and lubricate the bit, to carry cuttings to the surface, to support at least part of the weight of the drill pipe and drill bit, to provide a hydrostatic pressure head for prevention of caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid exhibit a relatively low rate of filtration or fluid loss in addition to having desirable rheological properties such as viscosity and gel strengths. It is also important that the drilling fluid system should be kept as simple and as inexpensive as possible in order to avoid undue expense in the drilling of a well.

When drilling through porous or fractured formations or other formations having a relatively high porosity or permeability to the drilling fluid it sometimes occurs that the drilling fluid is lost to the formation and a condition referred to as lost circulation obtains wherein the drilling fluid passes into the formation at such rate that circulation is greatly reduced or even terminated. In such case the drilling of the well must be stopped and the condition corrected before drilling can be continued again. If the condition of lost circulation can not be corrected, it is then necessary to abandon the well.

Various methods and means in the past have been employed to restore circulation of the drilling fluid when a lost circulation condition has occurred and such methods usually entain the addition to the drilling mud of fibrous materials to form a mat upon which a mud sheath can be deposited. Almost all known fibrous materials have been used in drilling mud compositions to seal the thief formation in attempts to restore circulation of the drilling fluid when a lost circulation condition has been encountered.

It is an object of this invention to provide a method for sealing a thief formation to correct a lost circulation condition. It is also an object of this invention to provide a composition which can be employed to correct lost circulation encountered in a drilling well. Still another object of this invention is to provide a composition which will form a stable aqueous slurry having extremely high water loss properties. It is also an object of this invention to provide a composition which will form a stable aqueous slurry having low viscosity and high water loss properties in both fresh and salt water systems. A method for forming a water permeable mat on the surface of a thief formation with the application of a minimum amount of hydrostatic pressure on the formation is still another object of this invention. Other objects and advantages of this invention will be apparent to one skilled in the art upon reading this disclosure including the detailed description of the invention.

Broadly the invention contemplates the formation of an extremely high water loss, aqueous slurry of diatomaceous earth or diatomite with a sufficient amount of asbestos to form a stable, low viscosity system and then spotting a slug of this slurry at the locus of the thief formation and then dehydrating the slurry by forcing the water from the slurry into the thief formation by increasing the hydrostatic head on the slurry. Upon completion of dehydration of the slurry, drilling mud is then circulated through the well bore to form a mud sheath on the high water loss filter cake that has been squeezed into the surface of the thief formation. We have also found that the addition of a relatively small amount of lime to the diatomite-asbestos slurry increases the water loss properties of the slurry substantially with only a small increase in the viscosity of the slurry. We have found that a high water loss slurry to be used for sealing porous earthen formations should be a low viscosity composition but should have an appreciable yield point value, as determined by the API method designated as RP29 in order to maintain the solids in suspension while being spotted at the locus of the thief formation.

The thief formation will usually be at or near the bottom of the well bore because when the porous formation is encountered it will immediately begin to take drilling fluid and the loss of drilling fluid will usually increase as the porous formation is penetrated. In such situations the high water loss slurry can be spotted at the locus of the thief formation by pumping a slug of the slurry down and out of the drill pipe. It may be, however, that the thief formation is at a point farther up in the well bore and such condition can result from failure of a previous seal in which case the drill pipe can be raised so that the slug of high water loss slurry can be deposited at the locus of the thief formation.

We have found that the use of the high water loss slurry of this invention when deposited as a slug at the locus of the thief formation and dehydrated by a low pressure squeeze results in the formation of a mat, suitable for deposition thereon of a mud sheath, which is quickly and economically obtained with no harmful effects to the thief formation or to other formations in the well bore. When lost circulation materials such as sugar cane bagasse, ground cottonseed hulls or other fibrous materials are added to a drilling fluid to form a bridging mat at a thief formation, excessive hydrostatic pressures are often required to dehydrate the drilling fluid sufficiently to form the desired mat. The application of high pressure to the thief formation, which may be a crevice or a gravel bed, often aggravates the situation by expanding the crevice or by causing channelling in the gravel bed. Furthermore, it is often dfficult to dehydrate a conventional, flow fluid loss drilling fluid at a sufficiently high rate to deposit a mat within or upon the surface of the thief formation. We have been able to restore circulation in drilling wells where conventional compositions and methods have completely failed.

Diatomite is also known as diatomaceous earth, infusorial earth or kieselguhr and is composed of the silicified skeletons of diatoms. Diatomite is abundantly available and relatively inexpensive. Aqueous slurries of diatomite for use as the high water loss slurries of our invention will usually contain from about 20 to 60 pounds of diatomite per barrel of slurry in either fresh or salt water. The slurry can, of course, contain more or less diatomite so long as the slurry is pumpable.

The asbestos used in our composition can be any chrysotile asbestos which will form a pumpable slurry. For reasons of economy asbestos which has been sufficiently ground to pass a U.S. standard 16 mesh screen or which corresponds to Group 7 according to the Quebec Screen Test adapted by the Quebec Asbestos Producers Association will often be preferred. A particularly preferred asbestos is California asbestos identified as Coalinga and obtained from the Johns-Manville Company. The California asbestos has the property of imparting appreciable yield point to an aqueous diatomite slurry with lower viscosity than that obtained with Canadian asbestos so that the diatomite can be satisfactorily suspended with a smaller amount of California asbestos than is possible with other types of chrysotile asbestos such as Canadian chrysotile asbestos. The amount of asbestos employed to stabilize an aqueous slurry of diatomite will generally be in the range of about 2 to about 15 pounds of asbestos per barrel of slurry.

The addition of a small amount of lime (calcium hydroxide) to the asbestos-stabilized diatomite slurry will increase the filtration rate of the slurry with a moderate increase in the viscosity and yield point of the slurry. The amount of lime employed will usually be about 0.5 to about 3 pounds of lime per barrel of slurry. A particularly suitable composition for preparing the high filtration slurry of this invention is a mixture of about 40 to 50 parts by weight of diatomite, about 5 parts by weight of asbestos and about 1 part by weight of lime so that this mixture can be added to water to make a stable high water loss slurry of any desired concentration. It may sometimes be desirable to add a conventional lost circulation material such as sugar cane bagasse, cottonseed hulls and the like to the slurry of the invention. The composition can contain from about 35 to 95 weight percent diatomite, about 5 to 65 weight percent asbestos, and from 0 to 10 weight percent lime. Lost circulation material can be added to an aqueous slurry of the composition in any desired amount.

The following examples will be helpful in attaining an understanding of the invention but should not be construed to limit the invention.

*Example I*

California asbestos having properties of about those of Group 7 according to the Quebec Screen Test adopted by the Quebec Asbestos Producers Association which Group 7 material is considered about 14 or 16 Standard U.S. mesh size, and commercial diatomite was slurried in tap water and tested with and without lime. The apparent viscosity, yield point and water loss values were determined according to "Recommended Practice on Standard Field Procedures for Testing Drilling Fluids," A.P.I. Code #RP29. The results are tabulated in Table I.

TABLE I.—EFFECT OF ASBESTOS CONCENTRATION ON AQUEOUS DIATOMITE SLURRIES

| Run No. | Aqueous Slurry Pounds per Barrel | | | Apparent Viscosity | Yield Point | Water Loss, ml. | |
|---|---|---|---|---|---|---|---|
| | Diatomite | Asbestos | Lime | | | Total Min.:Sec. | 30 Min. (calc.) |
| 1 | 50 | 5 | 0 | 16 | 7 | 234/5:10 | 564 |
| 2 | 50 | 5 | 1 | 21 | 26 | 232/2:15 | 848 |
| 3 | 50 | 10 | 0 | 22 | 15 | 222/4:40 | 562 |
| 4 | 50 | 15 | 0 | 38 | 43 | 190/4:20 | 500 |
| 5 | 40 | 2 | 0 | 6 | 3 | 256/3:55 | 710 |
| 6 | 40 | 4 | 0 | 12 | 7 | 260/3:20 | 780 |
| 7 | 40 | 5 | 0 | 14 | 6 | 258/4:40 | 654 |
| 8 | 40 | 10 | 0 | 19 | 20 | 244/5:10 | 590 |
| 9 | 40 | 15 | 0 | 36 | 32 | 226/4:50 | 562 |
| 10 | 44 | 5 | 1 | 20 | 26 | 248/1:25 | 1140 |

*Example II*

The following is a brief report on the use of the composition of the invention on various drilling wells in the Oklahoma Panhandle area. In each instance, unless otherwise indicated, the slurry was mixed in the ratio of 44 pounds of diatomite, 4 pounds of California asbestos and 1 pound of lime per barrel of aqueous slurry.

In well No. 1 circulation was lost at 6,268 feet while drilling. A pit of 100 barrels of the slurry of the invention was mixed and 5 pounds per barrel of sugar cane bagasse was added. The slurry was added to the bottom of the well bore by raising the drill pipe in stages as the slurry was pumped through the drill pipe. The plug of slurry was then squeezed by pumping drilling fluid in on top of the plug while keeping the drilling fluid return valve closed. The plug was squeezed with 500 p.s.i. and then held at 250 p.s.i. for 10 minutes and then the hydrostatic head of the drilling fluid was allowed to remain on the plug 4 hours. Drilling was then continued and no more drilling fluid was lost. The job was considered a complete success.

In well No. 2 circulation was lost while drilling at 4,184 feet. A pit of 100 barrels of the slurry of the invention was mixed and pumped into the well bore from the bottom of the surface casing. The well bore was then filled with drilling fluid but the plug was not squeezed and drilling was continued. After drilling one foot, circulation was again lost. The drill pipe was pulled up to the bottom of the surface casing and the well bore was filled with drilling fluid from the surface. After waiting 5 hours, drilling was continued with satisfactory circulation. At 5,504 feet circulation was again lost and a pit of drilling fluid was pumped into the well bore; however, the well bore would not fill. A pit of the slurry of the invention was mixed and pumped into the well bore 12 stands (about 1,200 feet) above the bottom of the well bore. The plug was squeezed with 300 p.s.i. and held at 100 p.s.i. Drilling was continued to 6.090 feet where circulation was again lost. A pit of the slurry of the invention was mixed, pumped into the well bore and drilling was continued without squeezing the plug of slurry. Circulation was again lost at 6,096 feet while drilling. Another pit of the slurry of the invention was mixed and spotted on the bottom of the well bore. The pipe was pulled to the bottom of the surface casing and squeezed with 400 p.s.i. Drilling was then continued and the well was drilled to total depth with no more loss of drilling fluid. It is believed that drilling fluid was lost in a new zone each time except possibly those where the plug was not squeezed.

In well No. 3 circulation was lost at 3,346 feet. A pit of 92 barrels of the slurry of the invention was mixed and spotted two stands above the bottom of the well bore. The plug was squeezed with 400 p.s.i. and held at 150 p.s.i. Drilling was then continued with complete circulation.

All field jobs to date with the slurry of the invention have been successful. It is advisable to squeeze the plug of slurry after it has been spotted in the well bore even though there have been occasions where satisfactory circulation was obtained without the squeeze job. The slurry of the invention works equally well with fresh water or salt water, the filtration rate being higher in a fresh water slurry when other factors are equal.

We claim:

1. A composition of matter for sealing porous earthen formations consisting essentially of a mixture of about 88 weight percent diatomite, 10 weight percent asbestos and 2 weight percent lime.

2. A composition of matter for sealing porous earthen formations consisting essentially of an admixture of about 40 to 50 parts by weight diatomite, about 5 parts by weight finely divided asbestos and about 1 part by weight lime.

3. The method of restoring lost circulation in a drilling well which comprises preparing an aqueous slurry of a mixture consisting essentially of diatomite and a sufficient amount of asbestos to suspend said diatomite in water; introducing said slurry into said well; positioning said slurry at the locus of circulation loss; applying sufficient hydrostatic pressure to said slurry to dehydrate same; and circulating drilling fluid through said well.

4. The method of restoring lost circulation in a drilling well which comprises preparing an aqueous slurry consisting essentially of about 20 to 60 pounds of diatomite, about 2 to 15 pounds of asbestos, and about 0 to 3 pounds of lime per barrel of slurry; introducing said slurry into said well; positioning said slurry at the locus of the thief formation; applying sufficient hydrostatic pressure to said slurry to dehydrate same; and circulating drilling fluid through said well.

5. A high water loss slurry consisting essentially of diatomite; an amount of water sufficient to form a pumpable slurry; an amount of asbestos sufficient to suspend said diatomite in said water; and about 0.5 to 3 pounds of lime per barrel of said slurry.

6. A high water loss aqueous slurry consisting essentially of about 20 to 60 pounds of diatomite per barrel of slurry; about 2 to 15 pounds of asbestos per barrel of slurry; and about 0.5 to 3 pounds of lime per barrel of slurry.

References Cited by the Examiner

UNITED STATES PATENTS

| | | | |
|---|---|---|---|
| 665,925 | 1/1901 | Nordtmeyer | 252—449 |
| 1,520,893 | 12/1924 | Teitsworth | 106—120 |
| 1,623,169 | 4/1927 | Dalen | 252—449 |
| 1,756,906 | 4/1930 | Miketta. | |
| 1,939,860 | 12/1933 | Montgomery | 252—449 |
| 2,442,519 | 6/1948 | Schuetz | 106—120 |
| 3,119,448 | 1/1964 | Rhoades | 166—29 X |
| 3,136,360 | 6/1964 | Ramos et al. | 166—29 X |

OTHER REFERENCES

Odasz, F.B., et al., New Sealer for Lost Circulation Zones, in The Oil and Gas Journal, pp. 72–73, Jan. 23, 1956.

Ruffin, D. R., New Squeeze for Lost-Circulation, in The Oil and Gas Journal (55), pp. 96–97, Oct. 28, 1957.

JACOB L. NACKENOFF, *Primary Examiner.*

CHARLES E. O'CONNELL, *Examiner.*

T. A. ZALENSKI, *Assistant Examiner.*